(12) United States Patent
Shimoyama et al.

(10) Patent No.: US 10,012,557 B2
(45) Date of Patent: Jul. 3, 2018

(54) PRESSURE SENSOR

(71) Applicants: SEIKO INSTRUMENTS INC., Chiba-shi, Chiba (JP); THE UNIVERSITY OF TOKYO, Tokyo (JP)

(72) Inventors: Isao Shimoyama, Tokyo (JP); Kiyoshi Matsumoto, Tokyo (JP); Hidetoshi Takahashi, Tokyo (JP); Minh-Dung Nguyen, Tokyo (JP); Takeshi Uchiyama, Chiba (JP); Manabu Oumi, Chiba (JP); Yoko Shinohara, Chiba (JP)

(73) Assignees: SEIKO INSTRUMENTS INC., Chiba-shi (JP); THE UNIVERSITY OF TOKYO, Tokyo (JP)

( * ) Notice: Subject to any disclaimer, the term of this patent is extended or adjusted under 35 U.S.C. 154(b) by 69 days.

(21) Appl. No.: 15/116,967

(22) PCT Filed: Feb. 27, 2015

(86) PCT No.: PCT/JP2015/055845
§ 371 (c)(1),
(2) Date: Aug. 5, 2016

(87) PCT Pub. No.: WO2015/137159
PCT Pub. Date: Sep. 17, 2015

(65) Prior Publication Data
US 2017/0131168 A1 May 11, 2017

(30) Foreign Application Priority Data
Mar. 13, 2014 (JP) .................. 2014-050552

(51) Int. Cl.
*G01L 1/22* (2006.01)
*G01L 9/00* (2006.01)

(52) U.S. Cl.
CPC .......... *G01L 9/0054* (2013.01); *G01L 9/0002* (2013.01); *G01L 9/0042* (2013.01)

(58) Field of Classification Search
CPC ............ G01L 9/0054; G01L 1/22; G01L 1/18
(Continued)

(56) References Cited

U.S. PATENT DOCUMENTS 5,908,981 A * 6/1999 Atalar .................... G01Q 20/02
356/501
7,136,215 B1 * 11/2006 Machida ............ G02B 26/0858
204/192.34
(Continued)

FOREIGN PATENT DOCUMENTS

JP H04-208827 A 7/1992
JP 06324074 A * 11/1994
(Continued)

OTHER PUBLICATIONS

Mar. 24, 2015 International Search Report issued in International Patent Application No. PCT/JP2015/055845.
(Continued)

*Primary Examiner* — Harshad R Patel
*Assistant Examiner* — Jamel Williams
(74) *Attorney, Agent, or Firm* — Oliff PLC

(57) ABSTRACT

A pressure sensor which detects variation in pressure, the pressure sensor including a cantilever which bends according to a pressure difference between the inside and the outside of a cavity in a sensor main body, and a first gap, a second gap, and a third gap which are formed on a proximal end portion of the cantilever. The first to third gaps electrically partition the proximal end portion of the cantilever into a first support portion, a second support portion, a first displacement detection portion, and a second displacement portion in a second direction orthogonal to a first direction
(Continued)

in which the proximal end portion and a distal end portion of the cantilever are connected to each other in plan view. The first and second displacement detection portions detect displacement according to the bending of the cantilever between the first and second support portion.

5 Claims, 10 Drawing Sheets

(58) Field of Classification Search
USPC .......................................................... 73/727
See application file for complete search history.

(56) References Cited

U.S. PATENT DOCUMENTS

| | | | |
|---|---|---|---|
| 2003/0027351 A1* | 2/2003 | Manalis | G01N 21/41 |
| | | | 436/165 |
| 2005/0210988 A1* | 9/2005 | Amano | G06K 9/0002 |
| | | | 73/704 |
| 2007/0145966 A1* | 6/2007 | Shekhawat | G01N 29/036 |
| | | | 324/71.1 |
| 2007/0209437 A1* | 9/2007 | Xue | B81B 3/0032 |
| | | | 73/514.31 |
| 2009/0079298 A1 | 3/2009 | Park et al. | |
| 2010/0218288 A1* | 8/2010 | Sarioglu | G01Q 20/02 |
| | | | 850/33 |
| 2013/0247676 A1* | 9/2013 | Uchiyama | G01L 9/0019 |
| | | | 73/721 |
| 2013/0247677 A1* | 9/2013 | Uchiyama | G01L 13/02 |
| | | | 73/721 |
| 2015/0096388 A1* | 4/2015 | Shimoyama | G01L 13/06 |
| | | | 73/862.627 |
| 2015/0362394 A1* | 12/2015 | Shimoyama | G01L 9/0001 |
| | | | 73/702 |
| 2016/0349130 A1* | 12/2016 | Shimoyama | G01L 9/0002 |
| 2017/0276563 A1* | 9/2017 | Shinohara | G01C 5/06 |
| 2017/0292877 A1* | 10/2017 | Shimoyama | G01L 1/2206 |

FOREIGN PATENT DOCUMENTS

| | | | | |
|---|---|---|---|---|
| JP | H06-324074 A | | 11/1994 | |
| JP | 2001-124797 A | | 5/2001 | |
| JP | 2003-156509 A | | 5/2003 | |
| JP | 2003-156510 A | | 5/2003 | |
| JP | 2003156510 A | * | 5/2003 | |
| JP | 2005249785 A | * | 9/2005 | ............. G01L 1/16 |
| JP | 2008-139136 A | | 6/2008 | |
| JP | 2008139136 A | * | 6/2008 | |
| JP | 2013-234853 A | | 11/2013 | |

OTHER PUBLICATIONS

Jan. 16, 2018 Notice of Allowance issued in Japanese Patent Application No. 2014-050552.

* cited by examiner

PRESSURE SENSOR

TECHNICAL FIELD

The present invention relates to a pressure sensor.

Priority is claimed on Japanese Patent Application No. 2014-050552, filed Mar. 13, 2014, the content of which is incorporated herein by reference.

BACKGROUND ART

In the related art, for example, as a pressure sensor (differential pressure sensor) which detects variation in pressure, a pressure sensor is known which includes an accommodation container having vent holes, a substrate which is disposed in the accommodation container and includes through holes or recessed portions, and a piezoelectric element which is vibratingly supported by the substrate in a cantilever manner in the through holes or recessed portions (for example, refer to PTL 1).

According to the pressure sensor, the piezoelectric element vibrates according to variation in pressure transmitted to the accommodation container via the vent holes, and a magnitude of a difference in pressure between this pressures and a pressure inside the through holes or the recessed portions following the variation in pressure. As a result, the pressure sensor can detect the variation in pressure transmitted to the accommodation container on the basis of a voltage change generated in the piezoelectric element.

CITATION LIST

Patent Literature

[PTL 1] Japanese Published Unexamined Patent Application No. H4-208827

SUMMARY OF INVENTION

Technical Problem

However, the detection sensitivity of the pressure sensor in the related art changes according to a shape of the piezoelectric element, volumes of the through holes or recessed portions, a flow rate of outside air going in and out of the through holes or the recessed portions, or the like. However, since the piezoelectric element has a double-sided electrode structure which includes electrode films or the like on both surfaces of a piezoelectric substance, there is a problem that it is difficult to decrease the thickness of the piezoelectric element so as to secure a large deformation amount. Accordingly, it is difficult to increase sensitivity while decreasing resonance frequency, and, for example, there is a problem that it is difficult to secure a desired sensitivity in a low frequency band such as 1 Hz or less. Moreover, in the case of a sensor which uses a piezoelectric element, there is a concern that variation in sensitivity or deterioration in sensitivity may occur due to parasitic electrostatic capacitance or wiring capacitance in the sensor.

Moreover, in the pressure sensor of the related art, since a detection portion supported in a cantilever manner is configured of the piezoelectric element, it is difficult to separate relationships between physical characteristics and electrical characteristics of the detection portion. Accordingly, a degree of freedom in design with respect to the pressure sensor is limited. In addition, for example, if a size of a cantilever is decreased in order to change physical characteristics thereof, the electrostatic capacitance of the sensor decreases, sensitivity thereof decreases, influences from parasitic capacitance or wiring capacitance relatively increase, and there is a problem that variation in sensitivity or deterioration in sensitivity easily occurs.

The present invention is made in consideration of the above-described circumstances, and an object thereof is to provide a pressure sensor capable of accurately detecting variation in pressure and of detecting the variation in pressure with improved sensitivity.

Solution to Problem (1) According to an aspect of the present invention, there is provided a pressure sensor which detects variation in pressure, including: a hollow sensor main body which includes a cavity formed inside the sensor main body and a communication opening which allows the cavity and the outside of the sensor main body to communicate with each other; and a cantilever which is disposed so as to close the communication opening in a cantilever state in which a distal end portion of the cantilever is a free end and a proximal end portion thereof is supported by the sensor main body, and which bends according to a pressure difference between the cavity and the outside of the sensor main body, in which a gap which configures a portion of the communication opening is formed on the proximal end portion, the proximal end portion is partitioned into a plurality of branch portions by gaps in a second direction orthogonal to a first direction in which the proximal end portion and the distal end portion are connected to each other in plan view, and some of the plurality of branch portions include displacement detection portions which detect displacement according to the bending of the cantilever on the basis of a change in a resistance value corresponding to the displacement.

(2) The displacement detection portion may include a plurality of branch detection portions which are electrically partitioned in the second direction by a partition portion having a larger resistance value than that of the displacement detection portion, and the branch detection portions may be electrically connected to each other so as to wrap around the outside of the partition portion.

(3) In the first direction, an end position of the gap on the distal end portion side may be positioned to be closer to the distal end portion side than to an end position of the partition portion on the distal end portion side.

(4) The partition portion may be a detection portion gap which configures a portion of the communication opening.

(5) The displacement detection portion may include a narrowed width detection portion in which a length of the displacement detection portion along the second direction is shorter than those of other portions in the displacement detection portion.

(6) A branch portion which does not have the displacement detection portions among the plurality of branch portions may include a width narrow portion in which a length of the branch portion along the second direction is shorter than those of other portions in the branch portion, and the width narrow portion may be disposed within the same positional range as a formation range of the narrowed width detection portion in the first direction.

(7) A piezoresistor may be provided in the displacement detection portion.

Advantageous Effects of Invention (1) According to the present invention, since the displacement detection portion is provided in a portion in which stress is concentrated when the cantilever is bent, it is possible to improve detection sensitivity.

In addition, it is possible to set dynamic characteristics of the cantilever using the branch portion which does not include the displacement detection portion, and it is possible to set electrical detection characteristics for detecting displacement corresponding to the bending of the cantilever using the displacement detection portion. That is, according to the present invention, it is possible to separate relationships between physical characteristics and electrical characteristics of the cantilever. Accordingly, even when the physical characteristics of cantilevers are the same as each other, it is possible to change the electrical detection characteristics thereof, and it is possible to prevent variation in sensitivity and deterioration in sensitivity due to parasitic electrostatic capacitance and wiring capacitance in the pressure sensor. In addition, it is possible to improve a degree of freedom in design.

(2) According to the present invention, since the displacement detection portion includes the plurality of branch detection portions disposed so as to be adjacent in the second direction, it is possible to relatively increase the region of each branch detection portion which has a higher stress concentration than that of the region in which the adjacent branch detection portions are connected to each other. Accordingly, it is possible to improve detection sensitivity, it is possible to accurately detect variation in pressure, and it is possible to detect variation in pressure with improved sensitivity. In addition, compared to a case where the displacement detection portion is not electrically partitioned into a plurality of branch detection portions, it is possible to increase a power-supply resistance of a power-supply path in the displacement detection portion, and it is possible to decrease current in a case where a predetermined voltage is applied to the power-supply path, that is, power consumption.

(3) According to the present invention, since the plurality of branch detection portions are provided such that stress is concentrated in the region of the proximal end portion side having a higher stress concentration relative to the distal end portion side of the cantilever, it is possible to improve detection sensitivity.

(4) According to the present invention, it is possible to improve electrical insulation properties of the partition portion.

(5) According to the present invention, it is possible to increase the power-supply resistance of the power-supply path in the displacement detection portion by providing the narrowed width detection portion, and it is possible to decrease the current in the case where a predetermined voltage is applied to the power-supply path, that is, the power consumption.

(6) According to the present invention, it is possible to increase the stress concentration in the narrowed width detection portion of the displacement detection portion by providing the width narrow portion, and it is possible to improve detection sensitivity.

(7) According to the present invention, since the piezoresistor is provided only in the displacement detection portion to which electrical detection characteristics are set, it is possible to reduce occurrences of leakage or short-circuiting between the displacement detection portion and an external pattern due to dirt or the like, and it is possible to improve detection accuracy.

DESCRIPTION OF EMBODIMENTS

Hereinafter, a pressure sensor according to an embodiment of the present invention is described with reference to the drawings.

A pressure sensor 1 of the present embodiment is a sensor which detects variation in pressure of a predetermined frequency band, and is disposed in a space in which an appropriate pressure transmission medium (for example, gas such as air, liquid, or the like) exists, or the like.

Figure 1:
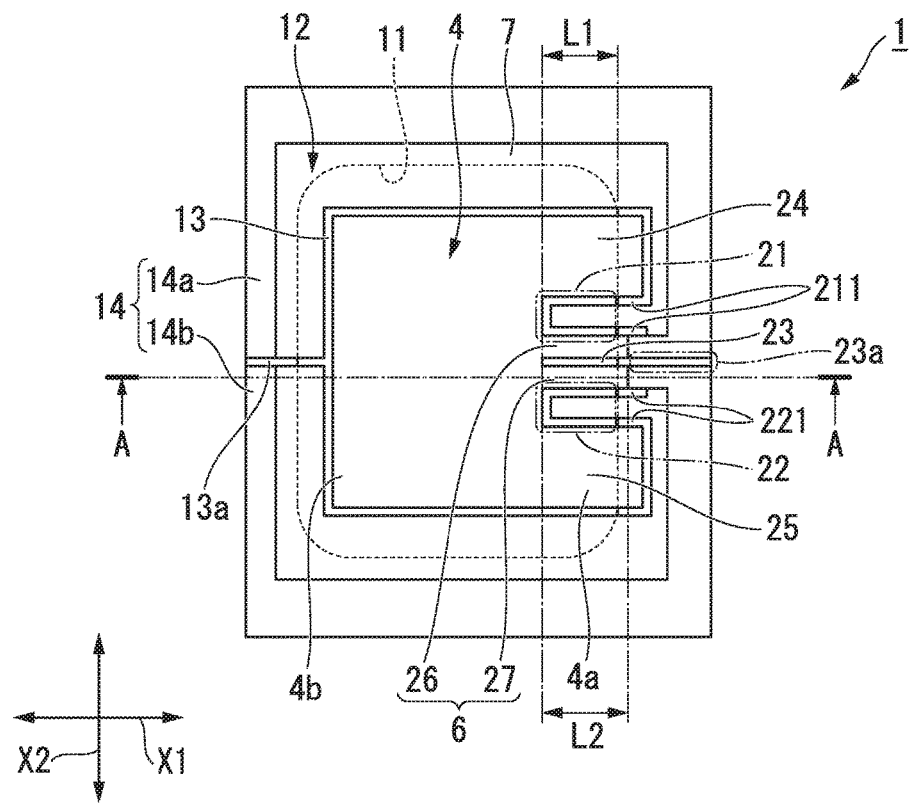
FIG. 1 is a plan view showing a configuration of a pressure sensor according to an embodiment of the present invention.
Figure 2:
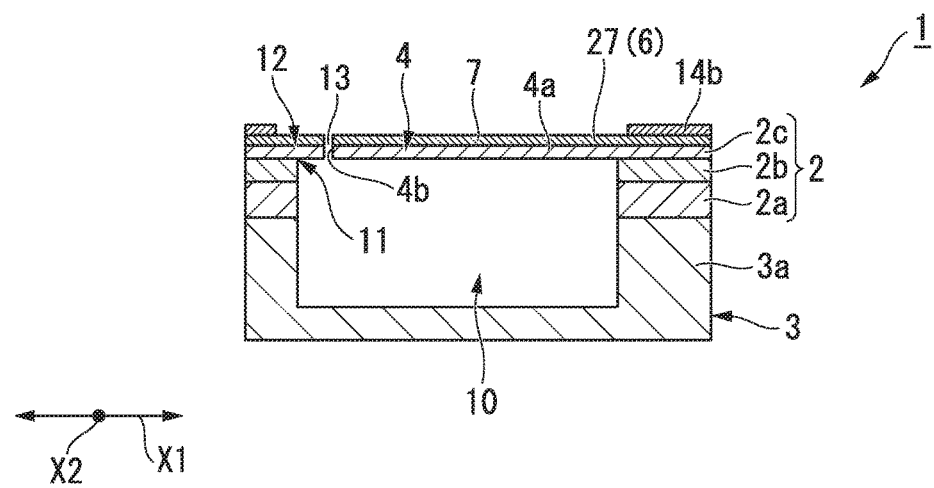
FIG. 2 is a sectional view showing the pressure sensor taken along line A-A shown in FIG. 1.

As shown in FIGS. 1 and 2, for example, the pressure sensor 1 has a shape in which a SOI substrate 2 and a sensor main body 3 are integrally fixed to each other, and includes a cantilever 4 which is formed on the SOI substrate 2, and a detection portion 6 which is connected to the cantilever 4 and detect displacement of the cantilever 4.

The SOI substrate 2 is formed by thermally bonding a silicon support layer 2a, an electrically insulating oxide layer 2b such as a silicon oxide film, and a silicon active layer 2c.

In addition, for example, a doping agent (impurities) such as phosphorus is doped on the entire region of the surface of the silicon active layer 2c of the SOI substrate 2 using various methods such as an ion implantation method or a diffusion method, and thus, a doped layer 7 functioning as a piezoresistor is formed.

For example, the sensor main body 3 has a hollow box shape which is formed of a resin material. The SOI substrate 2 is integrally fixed to the distal end (upper end) of an annular wall portion 3a of the sensor main body 3.

The silicon support layer 2a and the oxide layer 2b are annularly formed similarly to the wall portion 3a. The sensor main body 3, the silicon support layer 2a, and the oxide layer 2b have a hollow box shape as a whole, and form an internal space functioning as a cavity 10. A communication opening 11 communicating with the inside and the outside of the cavity 10 is formed at a location corresponding to the opening of each of the sensor main body 3, the silicon support layer 2a, and the oxide layer 2b.

The cantilever 4 is formed of the silicon active layer 2c of the SOI substrate 2. Specifically, the cantilever 4 is formed by shaping a gap 13 such that the cantilever 4 and the frame portion 12 are formed from the flat-plate shaped silicon active layer 2c.

The cantilever 4 has a cantilever structure in which a distal end portion 4b thereof is a free end and a proximal end portion 4a thereof is a fixed end. The proximal end portion 4a is fixed to the wall portion 3a of the sensor main body 3 via the silicon support layer 2a and the oxide layer 2b. The cantilever 4 is formed to be smaller than the size of the communication opening 11 which is formed of the sensor main body 3, the silicon support layer 2a, and the oxide layer 2b.

In the present embodiment, in a plan view of the pressure sensor 1, a direction in which the proximal end portion 4a and the distal end portion 4b of the cantilever 4 are connected to each other is defined as a first direction (hereinafter, referred to as a first direction X1), and a direction orthogonal to the first direction X1 is defined as a second direction (hereinafter, referred to as a second direction X2).

In addition, the first direction X1 corresponds to a length direction (depth direction) of the pressure sensor 1, and the second direction X2 corresponds to a width direction of the pressure sensor 1.

The gap 13 is provided from a region which communicates with the inside of the cavity 10 to a region in which the oxide layer 2b overlapping on the proximal end portion 4a exists, from the distal end portion 4b of the cantilever 4 toward the proximal end portion 4a. That is, in the region which communicates with the inside of the cavity 10, the gap 13 is disposed to configure a portion of the communication opening 11 (or to be included in the communication opening 11) which is formed by the sensor main body 3, the silicon support layer 2a, and the oxide layer 2b.

Moreover, as shown in FIG. 2, since the above-described cavity 10 is a bottomed box-shaped space in which a portion except for the gap 13 is sealed, it is possible to allow the pressure transmission medium to flow toward the outer portion and the inner portion via only the gap 13.

Here, when the entire SOI substrate 2 is viewed, the SOI substrate 2 is laminated on the sensor main body 3 so as to close the communication opening 11 of the sensor main body 3 and is integrally fixed to the sensor main body 3. In the SOI substrate 2, the silicon support layer 2a and the oxide layer 2b, which are annularly formed similarly to the wall portion 3a of the sensor main body 3, are continuous with the wall portion 3a of the sensor main body 3 and are provided to extend from the wall portion 3a toward upward.

In addition, the silicon active layer 2c forming the cantilever 4 is disposed so as to close the communication opening 11 which is formed by the sensor main body 3, the silicon support layer 2a, and the oxide layer 2b. Accordingly, the gap 13 which is provided on the silicon active layer 2c so as to form the cantilever 4 is disposed to configure a portion of the communication opening 11 (or to be included in the communication opening 11) of the sensor main body 3.

Since the cantilever 4 has a cantilever structure, the cantilever 4 is bent according to a pressure difference (that is, a pressure difference due to the pressure transmission medium which can flow between the inside and the outside of the cavity 10 via the gap 13) of the inside and the outside of the cavity 10 with the proximal end portion 4a as a center.

In addition, in the frame portion 12, an electrode 14 formed of a conductive material such as Au is formed on the surface of the doped layer 7 in a peripheral edge portion outside from the communication opening 11.

The electrode 14 is electrically divided into a first electrode 14a and a second electrode 14b by two gaps penetrating the silicon active layer 2c of the SOI substrate 2. For example, the two gaps include a branch gap 13a which is formed so as to be branched from the gap 13, and a third gap 23 described below and an auxiliary gap 23a which is connected to the third gap 23.

Figure 3:
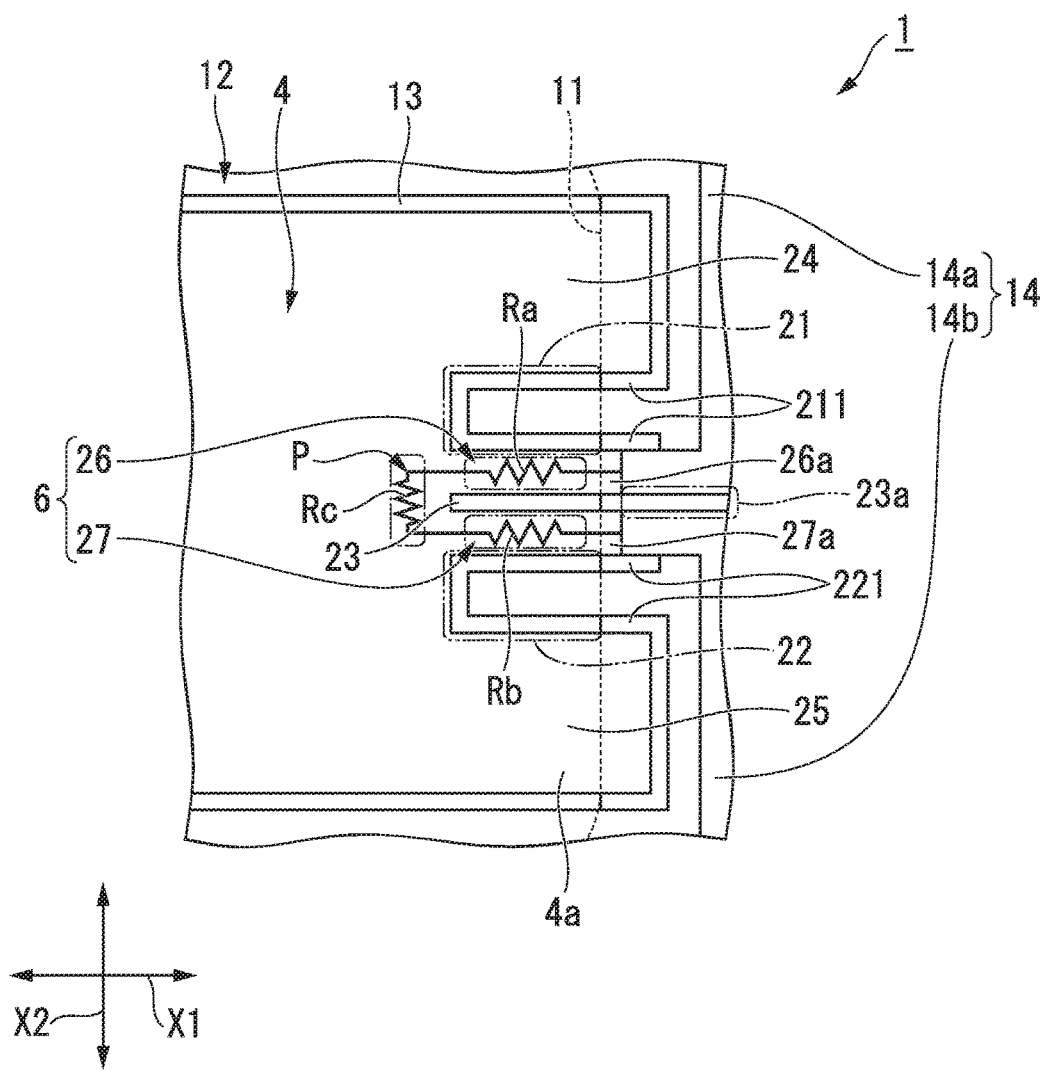
FIG. 3 is a plan view showing an enlarged configuration in the vicinity of a proximal end portion of a cantilever of the pressure sensor shown in FIG. 1.

As shown in FIGS. 1 and 3, a first gap 21, a second gap 22, and the third gap 23 which extend at approximately the same length in the first direction X1 are formed on the proximal end portion 4a of the cantilever 4.

The first to third gaps 21 to 23 are through holes which penetrate in a thickness direction of the cantilever 4 and are provided in a region which communicates with the inside of the cavity 10 from the proximal end portion 4a toward the distal end portion 4b along the first direction X1. That is, the first to third gaps 21 to 23 are formed such that at least a portion of each gap on the distal end portion 4b side configures (or is included in the communication opening 11) a portion of the communication opening 11 of the sensor main body 3.

Each of the first and second gaps 21 and 22 has a U shape in a plan view which extends to the distal end portion 4b side along the first direction X1. The third gap 23 is disposed between (for example, at the center portion in the width direction of the cantilever 4) the first and second gaps 21 and 22 in the second direction X2 (that is, width direction) orthogonal to the first direction X1 and has a linear shape in a plan view which extends to the distal end portion 4b side along the first direction X1.

In addition, the first and second gaps 21 and 22 penetrate the silicon active layer 2c in the region which communicates with inside of the cavity 10. The first and second gaps 21 and 22 are connected to the auxiliary gaps 211 and 221, which penetrate the silicon active layer 2c, in a region in which the oxide layer 2b overlapping on the silicon active layer 2c exists. The first and second gaps 21 and 22 are connected to the gap 13 via the auxiliary gaps 211 and 221. That is, the first gap 21 is connected to the gap 13 via the auxiliary gap 211, and the second gap 22 is connected to the gap 13 via the auxiliary gap 221.

For example, each of the first and second gaps 21 and 22 has a length L1 in the first direction X1.

The third gap 23 penetrates the silicon active layer 2c on the distal end portion 4b side from the inner circumferential end on the proximal end portion 4a side of first and second two electrodes 14a and 14b. For example, the third gap 23 has a length L2 in the first direction X1.

The end portion position of the third gap 23 on the distal end portion 4b side in the first direction X1 is set to the same position as the end portion positions of the first and second gaps 21 and 22 on the distal end portion 4b side in the first direction X1.

The third gap 23 is connected to an auxiliary gap 23a penetrating the silicon active layer 2c so as to partition the first and second two electrode 14a and 14b in the region in which the oxide layer 2b on which the silicon active layer 2c overlaps exists.

The first to third gaps 21 to 23 electrically partition the proximal end portion 4a of the cantilever 4 into a plurality of branch portions, that is, first and second support portions 24 and 25, and first and second displacement detection portions 26 and 27 in the second direction X2.

The first and second support portions 24 and 25 are provided on both end portion sides of the cantilever 4 in the second direction X2, and are electrically isolated from the first and second electrodes 14a and 14b by the gap 13.

The first support portion 24 is partitioned from the first displacement detection portion 26 via the first gap 21 in the second direction X2. The second support portion 25 is partitioned from the second displacement detection portion 27 via the second gap 22 in the second direction X2. The first and second support portions 24 and 25 are formed such that the lengths (widths) in the second direction X2 along the first direction X1 are constant.

The first and second displacement detection portions 26 and 27 are partitioned so as to be adjacent in the second direction X2 via the third gap 23. For example, the first and second displacement detection portions 26 and 27 are formed such that lengths (widths) in the second direction X2 are shorter (narrower) than those of the first and second support portions 24 and 25. The first and second displacement detection portions 26 and 27 are formed such that the lengths (widths) in the second direction X2 along the first direction X1 are constant.

The first and second displacement detection portions 26 and 27 include first and second electrode end portions 26a and 27a which are electrically connected to the first and second electrodes 14a and 14b different from each other on the proximal end portion 4a side. That is, the first displacement detection portion 26 includes the first electrode end portion 26a which is electrically connected to the first electrode 14a, and the second displacement detection portion 27 includes the second electrode end portion 27a which is electrically connected to the second electrode 14b.

The first and second displacement detection portions 26 and 27 are connected to each other via the doped layer 7 provided in the cantilever 4 to warp around the outer circumference (the outside) of the third gap 23.

The detection portion 6 includes the first and second displacement detection portion 26 and 27 provided on the cantilever 4.

According to the function as the piezoresistor due to the doped layer 7 provided on the cantilever 4, the first and second displacement detection portions 26 and 27 detect displacements according to the bending of the cantilever 4.

The piezoresistor is a resistance element in which an electrical resistance value is changed according to a bending amount (displacement amount) of the cantilever 4. The first and second displacement detection portions 26 and 27 are disposed so as to be paired in a state where the third gap 23 is interposed therebetween from both sides in the second direction X2 and are electrically connected to each other via the doped layer 7 to warp around the outer circumference (the outside) of the third gap 23. Accordingly, if a predetermined voltage is applied to a portion between the first and second electrodes 14a and 14b through a detection circuit 30 described below, a current due to the applied voltage flows from one of the first and second displacement detection portions 26 and 27 toward the other so as to wrap around the outer circumference (the outside) of the third gap 23.

An electric resistance value R in a path (current path) P of the current can be described as a sum of an electric resistance value Ra on the doped layer 7 of the first displacement detection portion 26, an electric resistance value Rb on the doped layer 7 of the second displacement detection portion 27, and an electric resistance value Rc on the doped layer 7 of the region in which the first and second displacement detection portions 26 and 27 are connected to each other so as to wrap around the outer circumference (the outside) of the third gap 23.

Since the electric resistance value R is changed according to the displacement (bending) of the cantilever 4 by the function as the piezoresistor due to the doped layer 7, the change of the electric resistance value R corresponds to the pressure difference generated between the inside and the outside of the cavity 10.

Figure 4:
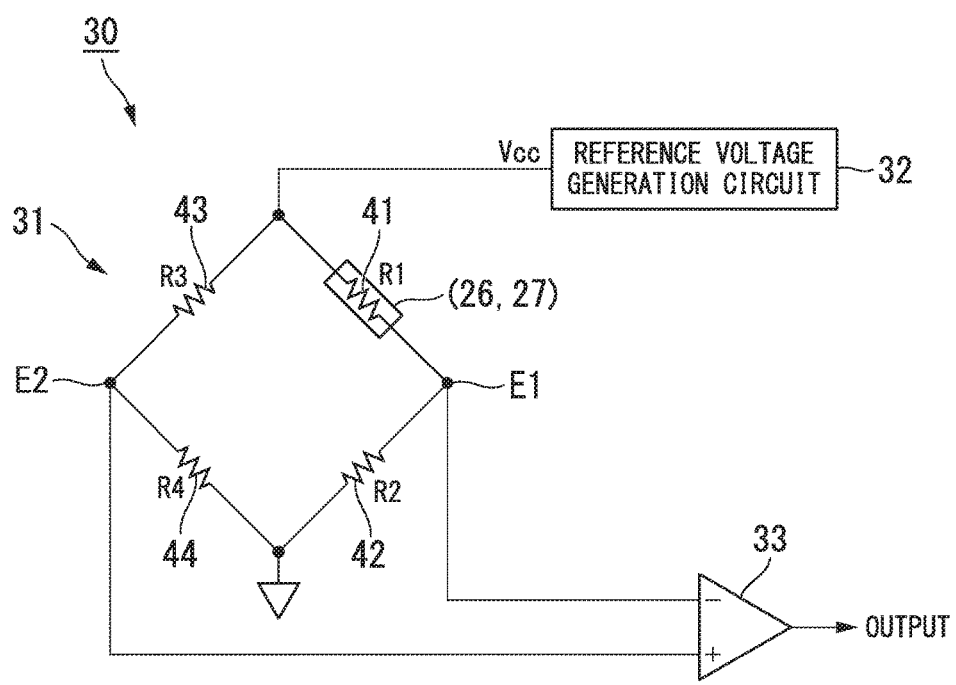
FIG. 4 is a configuration diagram of a detection circuit of the pressure sensor shown in FIG. 1.

The detection circuit 30 shown in FIG. 4 is connected to the first and second displacement detection portions 26 and 27 via the first and second electrodes 14a and 14b. The detection circuit 30 extracts the change of the electric resistance value R of the current path P, which is changed according to the displacement (bending) of the cantilever 4, as an electric output signal.

As shown in FIG. 4, the detection circuit 30 includes a bridge circuit 31, a reference voltage generation circuit 32, and a differential amplifier circuit 33.

For example, the bridge circuit 31 is a Wheatstone bridge circuit, and a branch side which is connected to first and second resistor portions 41 and 42 in series and a branch side which is connected to third and fourth resistor portions 43 and 44 in series are connected to the reference voltage generation circuit 32 in parallel.

The first resistor portion 41 is configured of the first displacement detection portion 26 and the second displacement detection portion 27 which are connected to each other in series between the first and second electrode end portions 26a and 27a. Accordingly, an electric resistance value R1 of the first resistor portion 41 is the electric resistance value R of the current path P. The second to fourth resistor portions 42 to 44 are fixed resistances, and include electric resistance values R2 to R4.

In the bridge circuit 31, a connection point E1 between the first and second resistor portions 41 and 42 is connected to an inverted input terminal of the differential amplifier circuit 33. In addition, a connection point E2 between the third and fourth resistor portions 43 and 44 is connected to a non-inverted input terminal of the differential amplifier circuit 33.

The reference voltage generation circuit 32 applies a predetermined reference voltage Vcc to a portion between the connection point of the first and third resistor portions 41 and 43 of the bridge circuit 31 and the connection portion of the second and fourth resistor portions 42 and 44.

The differential amplifier circuit 33 detects a potential difference between the two connection portions E1 and E2 of the bridge circuit 31, amplifies the potential difference at a predetermined amplification factor, and outputs the amplified potential difference. The potential difference becomes a value corresponding to the change of the electric resistance value R of the current path P.

Hereinafter, the operation of the pressure sensor 1 in a case where minute variation in pressure is applied to the above-described pressure sensor 1 is described with reference to FIGS. 5 and 6.

Figure 5:
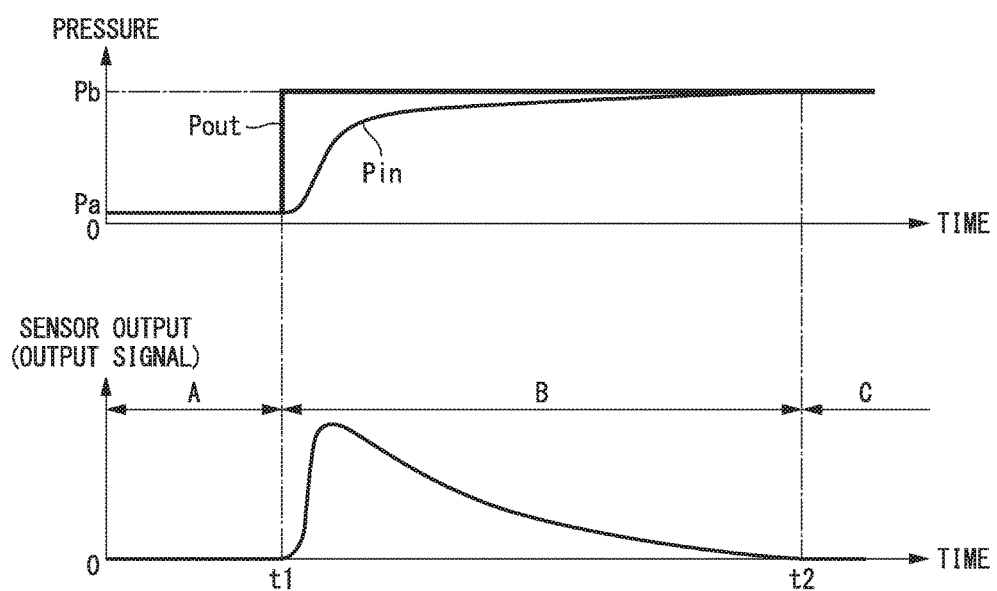
FIG. 5 is a diagram showing an example of an output signal of the pressure sensor shown in FIG. 1 and is a diagram showing a sensor output corresponding to an example of a correspondence relationship between an external atmospheric pressure and an internal atmospheric pressure.
Figure 6:
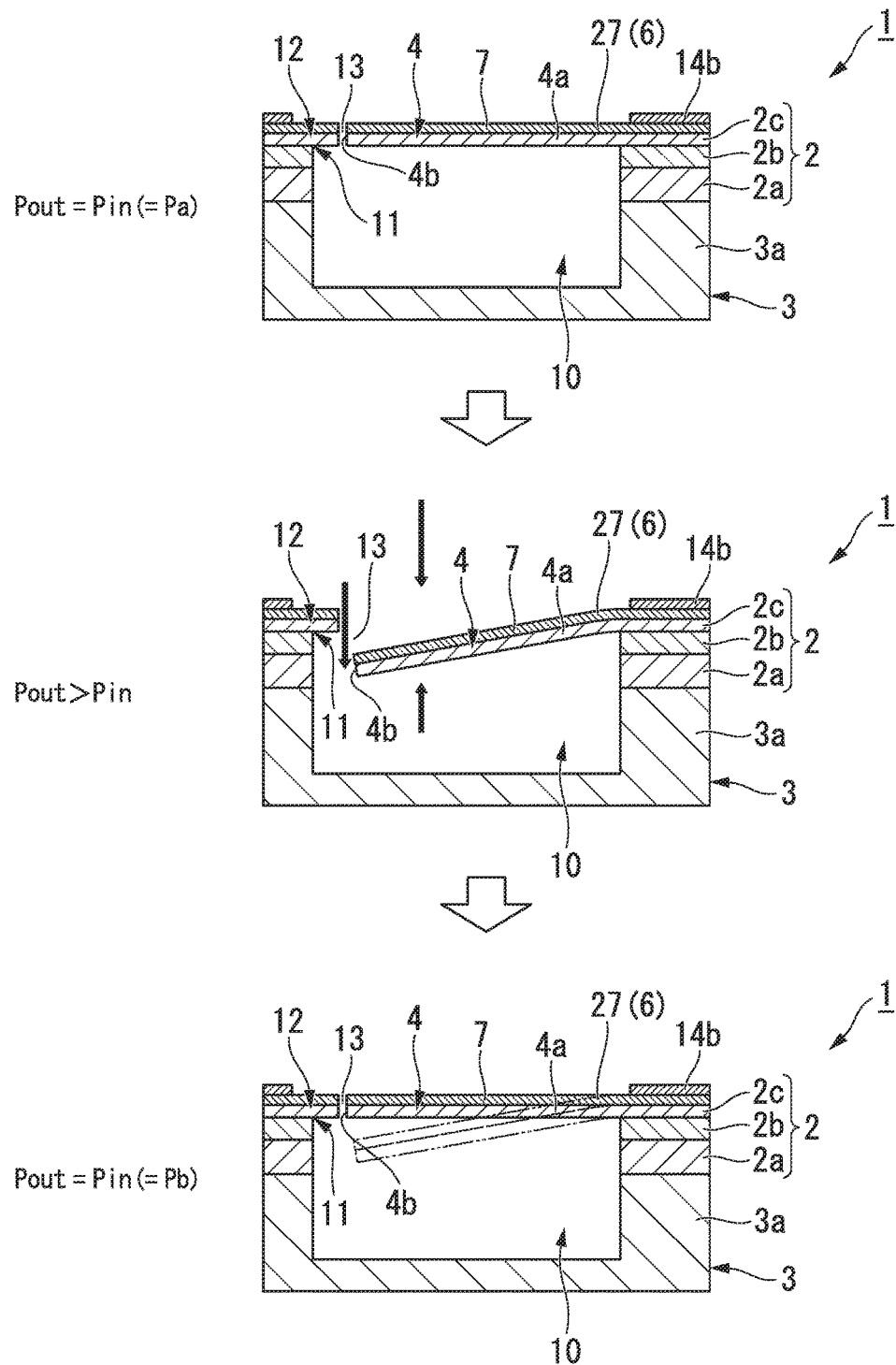
FIG. 6 is a view showing an example of an operation of the pressure sensor shown in FIG. 1 using the sectional view taken along line A-A shown in FIG. 1, and is a view showing three states, that is, a state where the external atmospheric pressure is the same as the internal atmospheric pressure, a state where the external atmospheric pressure is higher than the internal atmospheric pressure, and a state where the external atmospheric pressure and the internal atmospheric pressure have equilibrated with each other, in a case in which the state has shifted from the state of being the same to the equilibrated state via the state where the external atmospheric pressure is higher than the internal atmospheric pressure.

First, like a period A before a time t1 shown in FIG. 5, in a case where a pressure difference between a pressure Pout (predetermined first pressure Pa) outside the cavity 10 and a pressure Pin inside the cavity 10 is zero, the cantilever 4 is not bent as shown in the upper drawing of FIG. 6. Accordingly, an output signal (sensor output) output from the detection circuit 30 is a predetermined value (for example, zero).

In addition, like a period B after the time t1 shown in FIG. 5, if the pressure Pout outside the cavity increases, since the pressure difference is generated between the inside and the outside of the cavity 10, the cantilever 4 is bent toward the inside of the cavity 10 as shown in the intermediate drawing of FIG. 6. Accordingly, since distortion is generated in the first and second displacement detection portions 26 and 27 functioning as the piezoresistor according to the bending of the cantilever 4 and the electric resistance value R of the current path P is changed, the sensor output increases.

In addition, after the increase in the pressure Pout outside the cavity, the pressure transmission medium flows from the outside of the cavity 10 toward the inside thereof via the gap 13. Accordingly, the pressure Pin inside the cavity increases at a response which is more gently relative to the variation in the pressure Pout outside the cavity while being slower than the pressure Pout outside the cavity with the lapse of time. As a result, since the pressure Pin inside the cavity gradually approaches the pressure Pout outside the cavity, the pressure inside the cavity 10 and the pressure outside the cavity 10 are equilibrated, the bending of the cantilever 4 gradually decreases, and the sensor output gradually decreases.

In addition, like a period C after a time t2 shown in FIG. 5, if the pressure Pin inside the cavity and the pressure Pout (predetermined second pressure Pb) outside the cavity are the same as each other, as shown in the lower drawing of FIG. 6 the bending of the cantilever 4 according to the pressure difference is released such that the shape of the cantilever 4 is returned to the original shape, and the sensor output becomes a predetermined value (for example, zero) again.

As described above, according to the pressure sensor 1 of the present embodiment, since the first and second displacement detection portions 26 and 27 are provided between the first and second support portions 24 and 25, the gap between the first and second displacement detection portions 26 and 27 is smaller than the gap between the first and second support portions 24 and 25.

Accordingly, it is possible to decrease the electric resistance value Rc of the region in which the first and second displacement detection portions 26 and 27 are connected to each other. Accordingly, it is possible to increase the electric resistance values Ra and Rb of the first and second displacement detection portions 26 and 27, which have higher stress concentration than that of the region in which the first and second displacement detection portions 26 and 27 are connected to each other, relative to the electric resistance value R of the current path P.

Therefore, it is possible to improve detection sensitivity with respect to the changes of the electric resistance values Ra and Rb of the first and second displacement detection portions 26 and 27, and it is possible to accurately detect variation in pressure. In addition, it is possible to detect variation in pressure with improved sensitivity.

In addition, it is possible to set dynamic characteristics of the cantilever 4 using the first and second support portions 24 and 25, and it is possible to set electrical detection characteristics for detecting the displacement corresponding to the bending of the cantilever 4 using the first and second displacement detection portions 26 and 27. That is, in the cantilever 4, it is possible to separate relationships between physical characteristics and electric characteristics of the cantilever 4.

Accordingly, even when the physical characteristics of the cantilever 4 are the same as each other, it is possible to change the electrical detection characteristics thereof, and it is possible to prevent variation in sensitivity and deterioration in sensitivity due to parasitic electrostatic capacitance and wiring capacitance in the pressure sensor 1. In addition, it is possible to improve the degree of freedom in design of the pressure sensor 1.

First Modification Example

In the above-described embodiment, the end portion positions of the first and second gaps 21 and 22 on the distal end portion 4b side in the first direction X1 are set to the same position as the end portion position of the third gap 23 on the distal end portion 4b side in the first direction X1. However, the present invention is not limited to this.

The end portion positions of the first and second gaps 21 and 22 on the distal end portion 4b side in the first direction X1 may further protrude toward the distal end portion 4b side than toward the end portion position of the third gap 23 on the distal end portion 4b side in the first direction X1.

Figure 7:
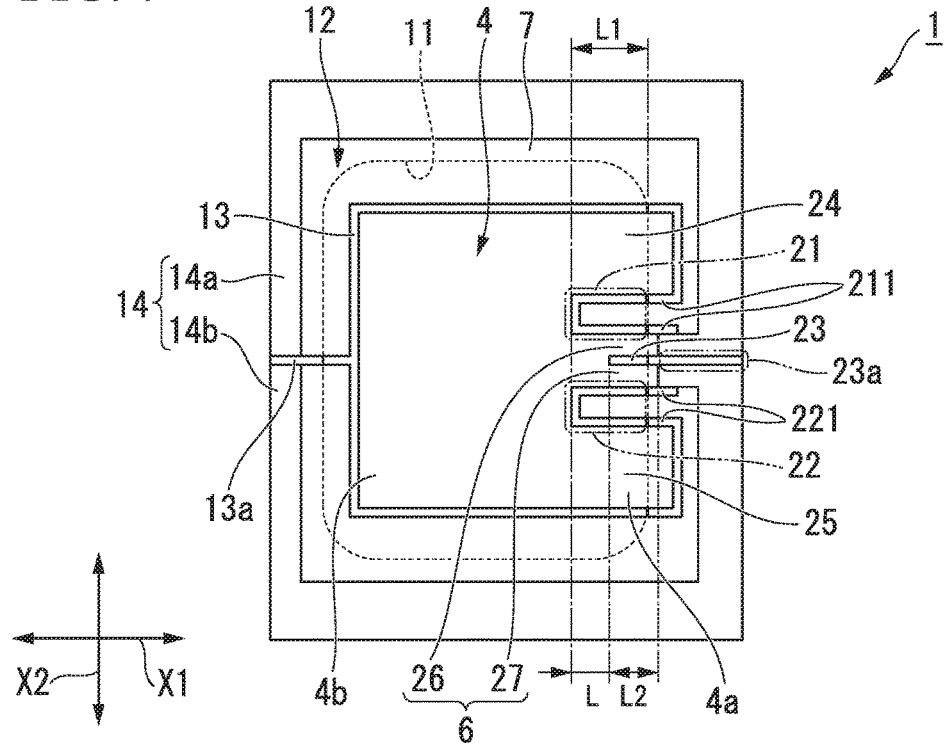
FIG. 7 is a plan view showing a configuration of a pressure sensor according to a first modification example of the embodiment of the present invention.

In the pressure sensor 1 according to a first modification example, as shown in FIG. 7, the end portion positions of the first and second gaps 21 and 22 on the distal end portion 4b side in the first direction X1 is positioned so as to further protrude toward the distal end portion 4b by a gap L than toward the end portion position of the third gap 23 on the distal end portion 4b side in the first direction X1.

According to the first modification example, it is possible to provide the first and second displacement detection portions 26 and 27 such that stress is concentrated in the region of the proximal end portion 4a side having higher stress concentration relative to the distal end portion 4b side of the cantilever 4, and it is possible to improve detection sensitivity.

Second Modification Example

In the above-described embodiment, the first and second displacement detection portions 26 and 27 are formed such that the lengths (widths) in the second direction X2 along the first direction X1 are constant. However, the present invention is not limited to this, and the lengths (widths) in the second direction X2 may be shortened (narrowed) at an approximate position while securing desired mechanical strength.

Figure 8:
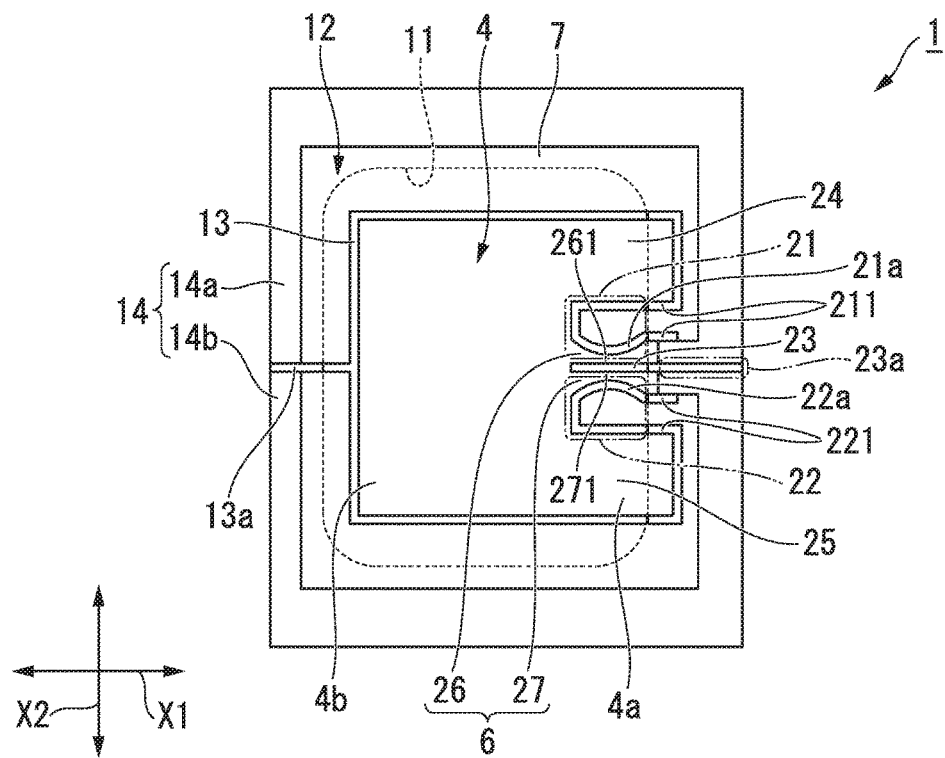
FIG. 8 is a plan view showing a configuration of a pressure sensor according to a second modification example of the embodiment of the present invention.

In the pressure sensor 1 according to a second modification example, as shown in FIG. 8, first and second bending portions 21a and 22a, which are bent so as to protrude toward the third gap 23 in the second direction X2, are provided in the first and second gaps 21 and 22.

The first and second bending portions 21a and 22a are provided on portions of the first and second gaps 21 and 22 facing the third gap 23 in the second direction X2 and are formed such that the approximately center portions thereof most protrude toward the third gap 23 side in the first direction X1.

Accordingly, in the first and second displacement detection portions 26 and 27, first and second narrowed width detection portions 261 and 271 in which the widths in the second direction X2 are narrowed are formed by the first and second bending portions 21a and 22a.

That is, in the first and second displacement detection portions 26 and 27, the first and second narrowed width detection portions 261 and 271 are formed, in which lengths in the second direction X2 are shorter than those of other portions in the first and second displacement detection portions 26 and 27.

According to the second modification example, since the first and second narrowed width detection portions 261 and 271 are provided, it is possible to increase the electrical resistance values Ra and Rb of the first and second displacement detection portions 26 and 27, and it is possible decrease the current in the case where a predetermined voltage is applied to the current path P via the detection circuit 30, that is, the power consumption.

In addition, since the first and second narrowed width detection portions 261 and 271 are provided on the center portions of the first and second displacement detection portions 26 and 27 in the first direction X1, it is possible to decrease power consumption while securing mechanical strength on the proximal end portion 4a side of the cantilever 4, that is, the fixed end side thereof.

Third Modification Example

In the above-described embodiment, the first and second support portions 24 and 25 are formed such that the lengths (widths) in the second direction X2 along the first direction X1 are constant. However, the present invention is not limited to this, and the lengths (widths) in the second direction X2 may be shortened (narrowed) at an approximate position while securing desired mechanical strength.

Figure 9:
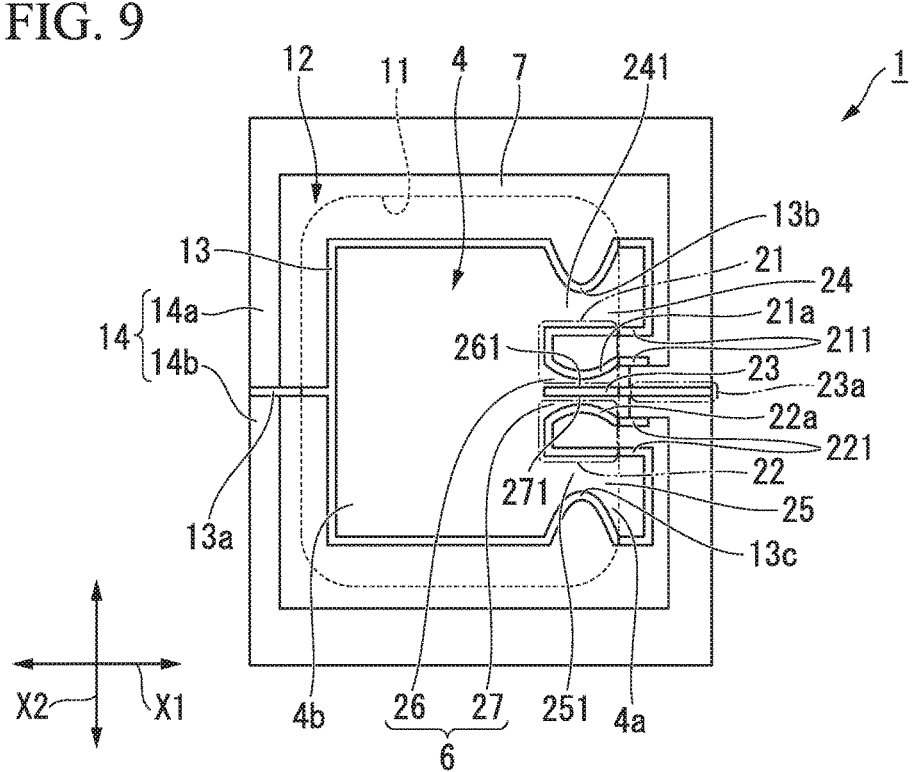
FIG. 9 is a plan view showing a configuration of a pressure sensor according to a third modification example of the embodiment of the present invention.

In the pressure sensor 1 according to a third modification example, similarly to the pressure sensor 1 according to the above-described second modification example, as shown in FIG. 9, the first and second bending portions 21a and 22a and the first and second narrowed width detection portions 261 and 271 are provided.

Moreover, in the pressure sensor 1 according to the third modification example, in the proximal end portion 4a of the cantilever 4, first and second gap bending portions 13b and 13c are provided on portions positioned on both ends of the gap 13 in the second direction X2 by the frame portion 12.

Each of the first and second gap bending portions 13b and 13c is bent so as to protrude toward each of the first and second gaps 21 and 22 along the second direction X2. For example, the first and second gap bending portions 13b and 13c are provided within the same position ranges as the formation ranges of the first and second bending portions 21a and 22a in the first direction X1. The first and second gap bending portions 13b and 13c are formed such that the positions of the portions most protruding in the first direction X1 are approximately the same as those of the first and second bending portions 21a and 22a.

Accordingly, in the first and second support portions 24 and 25, first and second width narrow support portions 241 and 251, in which the widths in the second direction X2 are narrowed by the first and second gap bending portions 13b and 13c, are formed within the same positional range as the formation range of the first and second narrowed width detection portions 261 and 271 in the first direction X1.

That is, in the first and second support portions 24 and 25, the first and second width narrow support portions 241 and 251 are provided, in which the lengths in the second direction X2 are shorter than those of other portions in the first and second support portions 24 and 25.

According to the third modification example, since the first and second width narrow support portions 241 and 251, it is possible to control the portion in which stress concentrates in the first and second displacement detection portions 26 and 27.

Particularly, since the first and second width narrow support portions 241 and 251 are provided within the same positional range as the formation range of the first and second narrowed width detection portions 261 and 271 in the first direction X1, stress can easily concentrate in the first and second narrowed width detection portions 261 and 271. Accordingly, it is possible to increase changes in the resistance values of the first and second narrowed width detection portions 261 and 271 having larger resistance values than those of other portions in the first and second displacement detection portions 26 and 27, and it is possible to improve detection sensitivity.

Fourth Modification Example

In the above-described third modification example, in the first and second support portions 24 and 25, the first and second width narrow support portions 241 and 251 are formed by the first and second gap bending portions 13b and 13c. However, the present invention is not limited to this.

Figure 10:
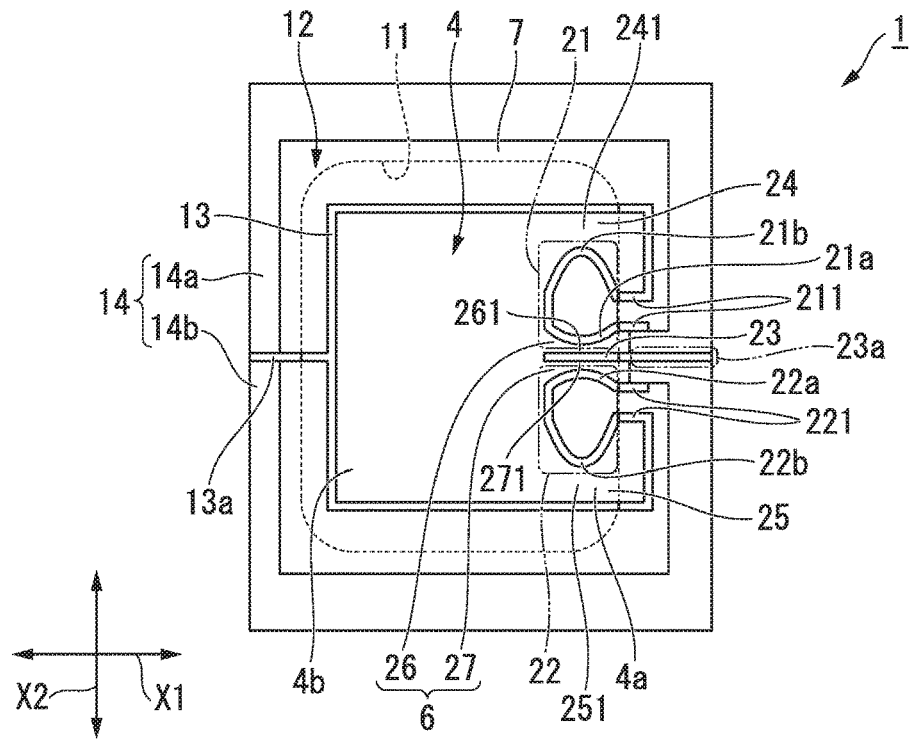
FIG. 10 is plan view showing a configuration of a pressure sensor according to a fourth modification example of the embodiment of the present invention.

In the pressure sensor 1 according to a fourth modification example, as shown in FIG. 10, instead of the first and second gap bending portions 13b and 13c of the above-described third modification example, third and fourth bending portions 21b and 22b are provided in the first and second gaps 21 and 22.

The third and fourth bending portions 21b and 22b are positioned on both ends of the first and second gaps 21 and 22 in the second direction X2 and are provided at portions facing the gap 13 in the second direction X2.

The third and fourth bending portions 21b and 22b are bent so as to protrude toward the portions positioned on both ends in the second direction X2 of the gap 13 along the second direction X2.

For example, the third and fourth bending portions 21b and 22b are provided within the same positional range as the formation ranges of the first and second bending portions 21a and 22a in the first direction X1. The third and fourth bending portions 21b and 22b are formed such that the positions of the portions most protruding in the first direction X1 are approximately the same as those of the first and second bending portions 21a and 22a.

Accordingly, in the first and second support portions 24 and 25, first and second width narrow support portions 241 and 251, in which the widths in the second direction X2 are narrowed by the third and fourth bending portions 21b and 22b, are formed within the same positional range as the formation range of the first and second narrowed width detection portions 261 and 271 in the first direction X1.

That is, in the first and second support portions 24 and 25, the first and second width narrow support portions 241 and 251 are provided, in which the lengths in the second direction X2 are shorter than those of other portions in the first and second support portions 24 and 25.

Accordingly, in the pressure sensor 1 according to the fourth modification example, effects similar to those of the third modification example can be exerted.

Fifth Modification Example

Figure 11:
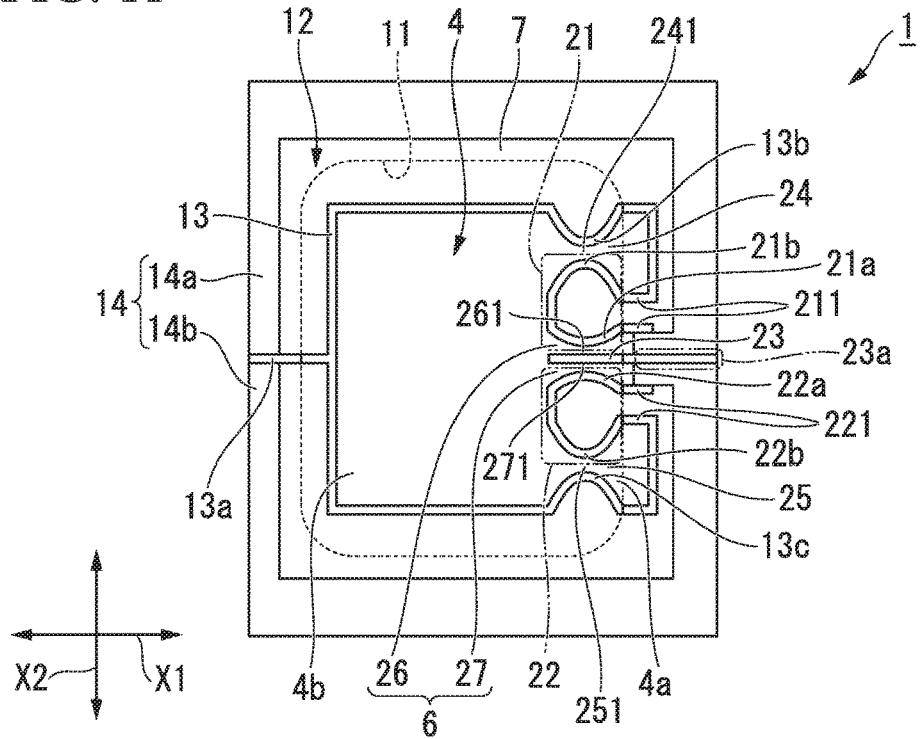
FIG. 11 is a plan view showing a configuration of a pressure sensor according to a fifth modification example of the embodiment of the present invention.

In the above-described second and third modification examples, as the pressure sensor 1 according to a fifth modification example shown in FIG. 11, the first and second gap bending portions 13b and 13c and the third and fourth bending portions 21b and 22b may be further provided.

Accordingly, in the first and second support portions 24 and 25, the first and second width narrow support portions 241 and 251 are formed by the first and second gap bending portions 13b and 13c and the third and fourth bending portions 21b and 22b.

Sixth Modification Example

In the above-described embodiment, each of the first and second gaps 21 and 22 has an approximately U shape in a plan view extending in the first direction X1. However, the present invention is not limited to this, and each of the first and second gaps 21 and 22 may have other shapes extending in the first direction X1.

Figure 12:
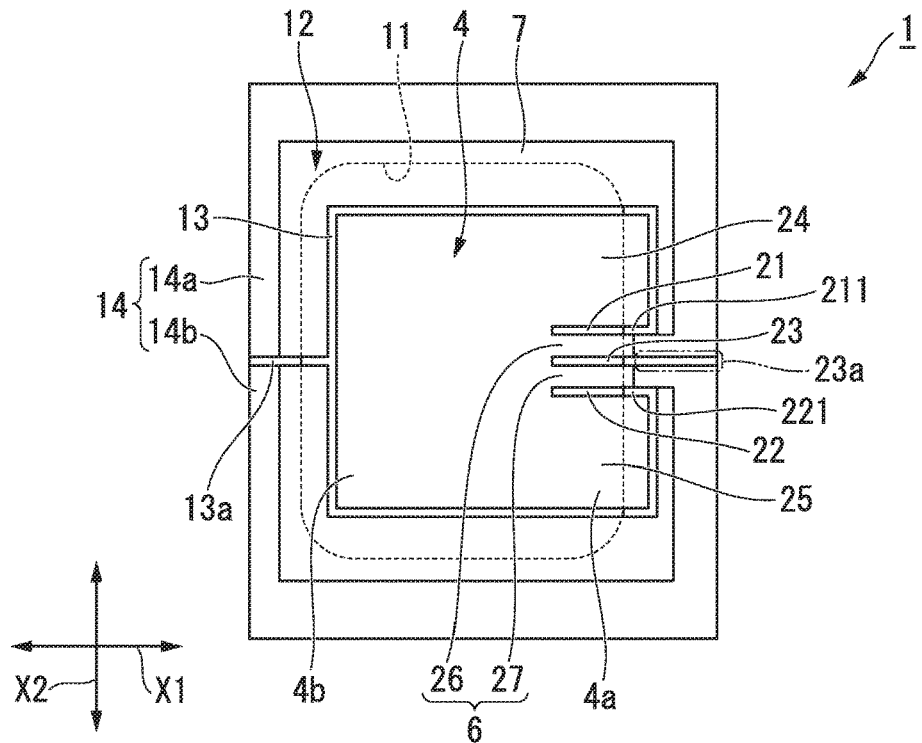
FIG. 12 is a plan view showing a configuration of a pressure sensor according to a sixth modification example of the embodiment of the present invention.

In the pressure sensor 1 according to a sixth modification example, as shown in FIG. 12, each of the first and second gaps 21 and 22 has a linear shape in a plan view extending in the first direction X1.

Seventh Modification Example

In the above-described embodiment, the doped layer 7 is formed on the entire surface of the silicon active layer 2c of the SOI substrate 2. However, the present invention is not limited to this.

Figure 13:
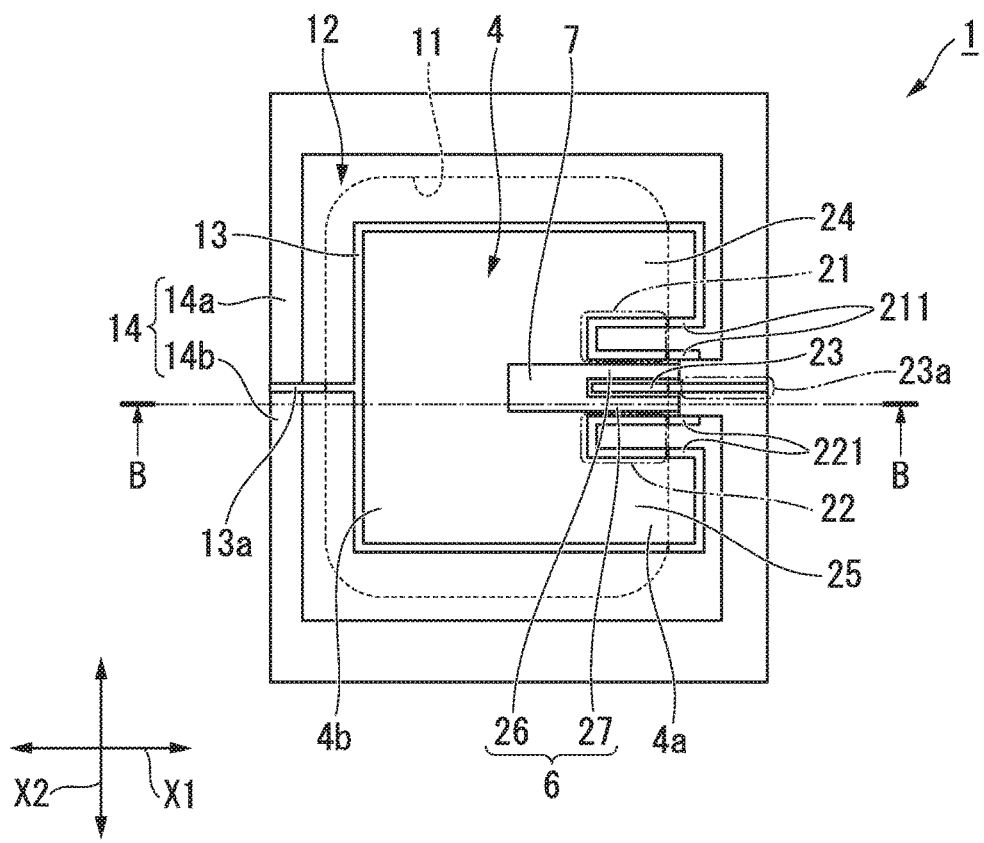
FIG. 13 is a plan view showing a configuration of a pressure sensor according to a seventh modification example of the embodiment of the present invention.
Figure 14:
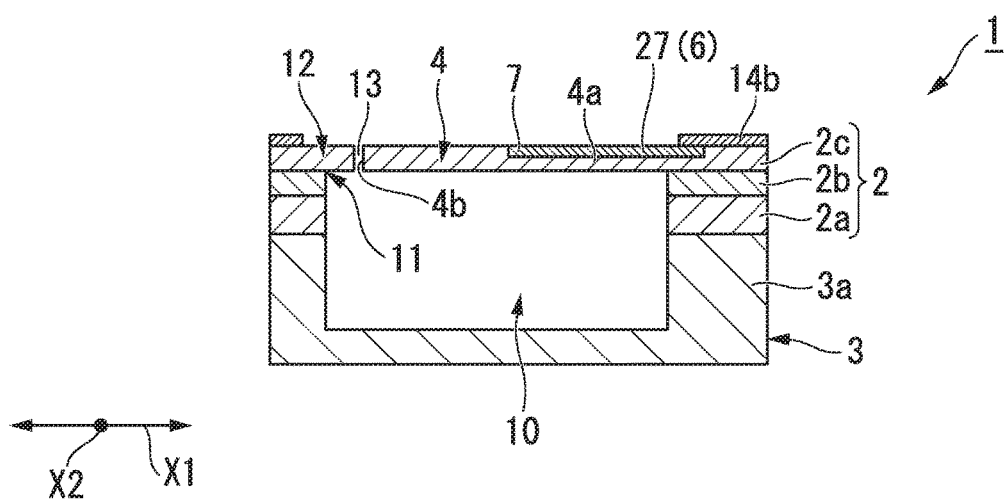
FIG. 14 is a sectional view of the pressure sensor taken along line B-B shown in FIG. 13.

In the pressure sensor 1 according to a seventh modification example, as shown in FIGS. 13 and 14, in the region of the silicon active layer 2c of the SOI substrate 2, the doped layer 7 is continuously formed only on the first and second displacement detection portions 26 and 27 and in the region in which the first and second displacement detection portions 26 and 27 are connected to each other so as to warp around the outer circumference (the outside) of the third gap 23.

According to the seventh modification example, since the doped layer 7 is partially provided on the silicon active layer 2c, it is possible to reduce occurrences of leakage or short-circuiting between the silicon active layer 2c and an external pattern due to dirt or the like, and it is possible to improve detection accuracy.

Eighth Modification Example

In the above-described embodiment, a wiring portion configured of a conductive material such as Au may be provided on the surface of the region in which the first and second displacement detection portions 26 and 27 are connected to each other so as to warp around the outer circumference (the outside) of the third gap 23 in the cantilever 4.

According to an eighth modification example, since the wiring portions are provided, it is possible to decrease the electric resistance value Re of the region in which the first and second displacement detection portions 26 and 27 are connected to each other. Accordingly, it is possible to increase the electric resistance values Ra and Rb of the first and second displacement detection portions 26 and 27, which have higher stress concentration than that of the region in which the first and second displacement detection portions 26 and 27 are connected to each other, relative to the electric resistance value R of the current path P.

Therefore, it is possible to improve detection sensitivity with respect to the changes of the electric resistance values Ra and Rb of the first and second displacement detection portions 26 and 27, and it is possible to accurately detect variation in pressure.

Ninth Modification Example

In the above-described embodiment, the first and second displacement detection portions 26 and 27 are partitioned so as to be adjacent to each other via the third gap 23 in the second direction X2. However, the present invention is not limited to this.

For example, instead of providing the third gap 23, in the first and second displacement detection portions 26 and 27, the silicon active layer 2c which does not have the doped layer 7 may be provided within the range corresponding to the third gap 23. That is, instead of the third gap 23, the silicon active layer 2c on which the doped layer 7 is not formed so as to be exposed may be provided between the first and second displacement detection portions 26 and 27.

Figure 15:
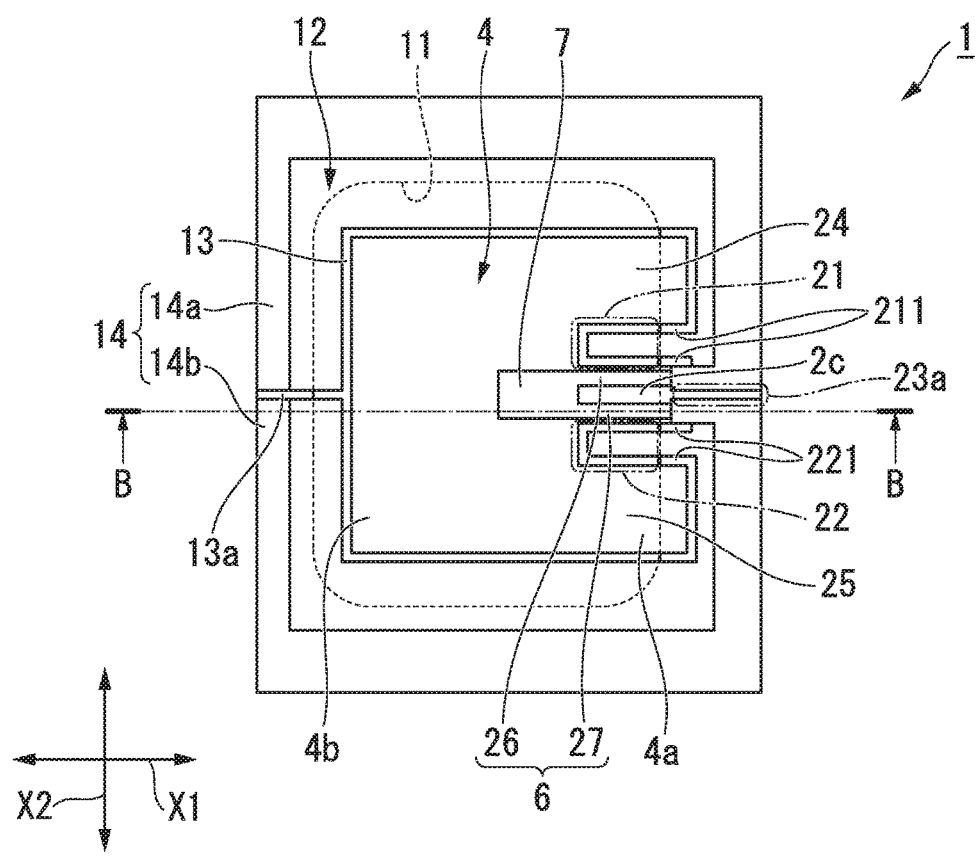
FIG. 15 is a plan view showing a configuration of a pressure sensor according to a ninth modification example of the embodiment of the present invention.

For example, in the pressure sensor 1 according to a ninth modification example shown in FIG. 15, instead of the third gap 23 of the seventh modification example shown in FIG. 13, the silicon active layer 2c which does not have the doped layer 7 is provided. That is, in the silicon active layer 2c in which the third gap 23 is omitted, the doped layer 7 is continuously formed only on the first and second displacement detection portions 26 and 27 and in the region in which the first and second displacement detection portions 26 and 27 are connected to each other.

The above-described embodiments are exemplified and do not limit the claims. The embodiments can be variously embodied, and various omissions, replacements, and modifications can be applied to the embodiments within a scope which does not depart from the gist of the present invention. The embodiments or modifications thereof are included in the scope of the invention or the gist thereof, and are included in the invention disclosed in the claims and the scope equivalent to the claims.

INDUSTRIAL APPLICABILITY

According to the present invention, it is possible to accurately detect variation in pressure, and it is possible to detect variation in pressure with improved sensitivity. Accordingly, industrial applicability can be realized.

REFERENCE SIGNS LIST

X1: first direction
X2: second direction
1: pressure sensor
3: sensor main body
4: cantilever
4a: proximal end portion of cantilever
4b: distal end portion of cantilever
6: detection portion 7: doped layer (piezoresistor)
10: cavity
11: communication opening
12: frame portion
14a, 14b: first electrode, second electrode
21, 22: first gap, second gap (gap)
23: third gap (detection portion gap, partition portion)
24, 25: first support portion, second support portion (branch portion)
26, 27: first displacement detection portion, second displacement detection portion (branch detection portion, displacement detection portion)
26a, 27a: first electrode end portion, second electrode end portion
261, 271: first narrowed width detection portion and second narrowed width detection portion (narrowed width detection portion)
241, 251: first width narrow support portion and second width narrow support portion (width narrow portion)

The invention claimed is:

1. A pressure sensor which detects variation in pressure, comprising:
a hollow sensor main body which includes a cavity formed inside the sensor main body and a communication opening which allows the cavity and the outside of the sensor main body to communicate with each other; and
a cantilever which is disposed so as to close the communication opening in a cantilever state in which a distal end portion of the cantilever is a free end and a proximal end portion thereof is supported by the sensor main body, and which bends according to a pressure difference between the cavity and the outside of the sensor main body,
wherein a gap which configures a portion of the communication opening is formed on the proximal end portion,
wherein the proximal end portion is partitioned into a plurality of branch portions by gaps in a second direction orthogonal to a first direction in which the proximal end portion and the distal end portion are connected to each other in plan view,
wherein a first subset of the plurality of branch portions includes displacement detection portions which detect displacement according to the bending of the cantilever on the basis of a change in a resistance value corresponding to the displacement of the cantilever,
wherein a second subset of the plurality of branch portions does not include displacement detection portions,
wherein the displacement detection portions include a plurality of branch detection portions which are electrically partitioned in the second direction by a partition portion having a larger resistance value than that of the displacement detection portions,
wherein a piezoresistor is provided in the displacement detection portions, and
wherein the branch detection portions are electrically connected to each other via the piezoresistor so as to go around an outside of the partition portion.

2. The pressure sensor according to claim 1,
wherein in the first direction, an end position of the gap on the distal end portion side is positioned to be closer to the distal end portion side than to an end position of the partition portion on the distal end portion side.

3. The pressure sensor according to claim 1,
wherein the partition portion is a detection portion gap which configures a portion of the communication opening.

4. The pressure sensor according to claim 1,
wherein the displacement detection portions include a narrowed width detection portion in which a length of the displacement detection portions along the second direction is shorter than those of other portions in the displacement detection portions.

5. The pressure sensor according to claim 4,
wherein a branch portion which does not have the displacement detection portions among the plurality of branch portions includes a width narrow portion in which a length of the branch portion along the second direction is shorter than those of other portions in the branch portion, and
wherein the width narrow portion is disposed within the same positional range as a formation range of the narrowed width detection portion in the first direction.

* * * * *